Patented Jan. 28, 1936

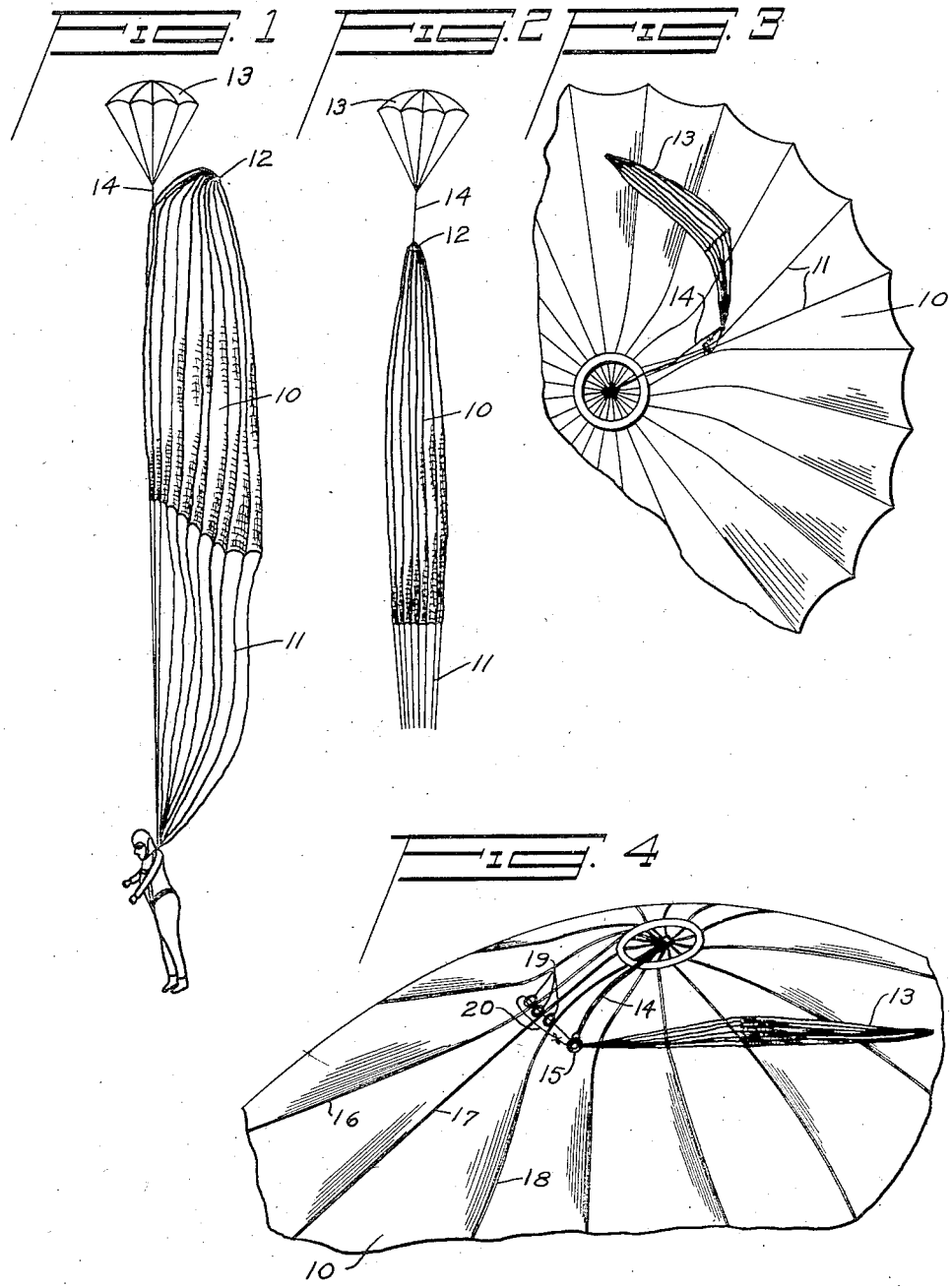

2,028,777

UNITED STATES PATENT OFFICE 2,028,777

PARACHUTE CONSTRUCTION

Edward L. Hoffman, Dayton, Ohio

Application August 24, 1932, Serial No. 630,238

7 Claims. (Cl. 244—21)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to parachutes and more particularly to improvements which are directed for providing a parachute in which the operation of opening is controllable regardless of the speed of descent.

Parachutes in use heretofore, particularly parachutes of large diameter adapted for lowering great loads such as an airplane or the like, have required too great an interval of time in opening in comparison to the time interval of opening required in the smaller conventional parachute, i. e., the man-carrying type. The reason for this is quite apparent. The contents of the large parachutes are as much as 15 to 20 times that of the smaller or man-carrying parachutes, hence 15 to 20 times as much air must enter the larger parachute before full inflation occurs. However, the mouths of both parachutes when in a strung-out position are substantially equal in size due to the pull exerted by the conventional pilot parachute with which both are usually equipped. In an emergency it is of vital importance to obtain quick opening of a parachute and since the time of opening of the large parachutes, for example, those of 60 to 65-foot diameter, is about ten seconds as compared to two seconds required in opening a regulation 24-foot, man-carrying parachute, it will be readily understood that this great loss in time under emergency conditions is of utmost importance.

The main object therefore of the present invention is to provide in connection with a parachute of this general character means for effecting a quicker opening of the parachute than has been heretofore obtained.

A still further object of the present invention is to provide in connection with a parachute of this general character means which is so constructed and arranged such that the mouth of the parachute is materially increased in size when in a strung-out position so that the volume of the air entering the mouth of the parachute when strung out is greatly increased so that a more rapid inflation of the parachute canopy is obtained.

A still further object of the present invention is to provide in connection with a parachute of this general character a pilot parachute secured to one or more parachute lines near the top portion of the canopy at a point or points eccentrically disposed with respect to its center of pressure area so that when the canopy of the main parachute is strung out the pull of the pilot parachute will be taken through the point or points of attachment of the attached suspension lines, the other suspension lines being limp, and under these conditions the mouth of the main parachute will be increased in size so that an increase in the volume of air entering the mouth will be effected, this by reason of the fact that the length of canopy extended taut by the pilot parachute is less than its normal strung out length.

A still further object of the present invention resides in providing in a parachute of this character, having a pilot parachute attached at the apex thereof, frangible means for securing the pilot parachute in an off-center position with respect to the apex of the canopy of the main parachute, that is to say, eccentric with respect to the center of pressure area of the main parachute, so that when the main parachute is in the strung-out position certain of the suspension lines will be taut with the remainder of the suspension lines carried loosely by the main canopy in order to effect a greater opening of the mouth of the main parachute. By attaching the pilot parachute to the main parachute in an off-center position by means of frangible cord or the like, certain advantages are found to exist. At high speeds, when quick openings are not desirable, due to the fact that the additional strain on the canopy of the main parachute might result in ripping of the canopy, the frangible cord for securing the pilot parachute to the main parachute in an off-center position will break. As a result, when strung out the mouth of the main parachute will have a normal opening and the pull of the pilot parachute will be evenly distributed on all of the suspension lines and the usual opening will therefore be effected. On the other hand at low speeds, under which condition a quick opening is essential and with the pilot parachute attached in an off-center position, the mouth is greatly enlarged and a more rapid opening will therefore be effected.

With these and other objects in view, it will be apparent as the description proceeds that the invention resides in the construction, combination and arrangement of the parts hereinafter more fully described and claimed and illustrated in the accompanying drawing, in which:

Fig. 1 illustrates generally the manner of attaching the pilot parachute to the canopy of the main parachute in an off-center position;

Fig. 2 is a view similar to Fig. 1 with the pilot parachute attached to the apex of the canopy of the main parachute;

Fig. 3 is a fragmentary view showing the manner in which the pilot parachute is attached to several of the suspension lines of the main parachute; and Fig. 4 is an enlarged fragmentary detail view illustrating the manner in which the pilot parachute is attached to the main parachute in an off-center position by frangible cords.

Referring more particularly to the drawing, wherein corresponding parts are designated by like numerals throughout the several views, the preferred embodiment of my invention herein illustrated includes a main canopy 10 having the usual suspension lines 11 secured thereto, which are joined together at their upper ends, as shown by numeral 12 at the apex of the main canopy, as shown in Figs. 1 and 2. These suspension lines are connected at their lower ends to a load to be lowered which in the present illustrative case and for convenience is shown as being connected to the body harness of an aviator.

The main canopy is provided with the conventional pilot parachute 13, which is secured to the apex 12 of the main canopy by means of a static lanyard 14. As shown in Fig. 4, a ring 15 is provided, to which the suspension lines of the pilot parachute are secured. This ring also serves as a means for connecting the above-referred-to static lanyard to the pilot parachute. It will be noted by referring to Fig. 4 that I have provided several of the suspension lines herein designated by numerals 16, 17 and 18 with rings 19, which are fixedly secured to the suspension lines at points off-center with respect to the apex of the main canopy which points are eccentrically disposed with respect to the center of pressure area of the main canopy.

In order to secure the pilot parachute to the canopy of the main parachute in an off-center position, I provide frangible means such as a cord 20, which is passed through each of the rings 19, as illustrated in Fig. 4, and thereafter looped through the ring 15 and knotted together as shown.

From the foregoing description it will be apparent that when in the strung-out position illustrated in Fig. 1 that the suspension lines 16, 17 and 18 will be tightly held due to the pull exerted by the pilot parachute, which pull is directly taken by the suspension lines 16, 17 and 18. This has a tendency to open the mouth of the parachute in the manner illustrated in Fig. 1 so that the volume of air entering the mouth will be greatly increased and a rapid inflation of the canopy will occur. The tensile strength of the frangible cord is such as to readily break at high speeds. When this occurs the pull of the pilot parachute will be evenly distributed among all of the suspension lines in the manner shown in Fig. 2 and at this time a normal mouth opening of the main canopy will be obtained to effect a slow opening of the canopy.

I claim:

1. The combination with a main parachute and a pilot parachute fixedly secured to the apex of said main parachute, of frangible means for connecting said pilot parachute to said main parachute at points off-center with respect to the center of said main parachute.

2. The combination with a main parachute and a pilot parachute fixedly secured to the apex of said main parachute, of frangible means for connecting said pilot parachute to said main parachute at points off-center with respect to the center of said main parachute and to the shroud lines of the auxiliary parachute.

3. In an apparatus of the class described, a main parachute and a pilot parachute, primary means for connecting said pilot parachute to said main parachute at the apex thereof, and secondary connecting means between said pilot parachute and the canopy of said main parachute, said secondary means being so constructed and arranged such that the pull exerted by the pilot parachute, when inflated, is positioned between the apex and skirt portion of the main parachute and eccentric with respect to its center of pressure area so that the length of canopy extended taut by the pilot parachute is less than the normal strung out length of said canopy.

4. In an apparatus of the class described, a main parachute and a pilot parachute, primary means for connecting said pilot parachute to said main parachute at the apex thereof, and secondary connecting means between said pilot parachute and the canopy of said main parachute, said secondary connecting means being so constructed and arranged such that the pull exerted by the pilot parachute, when inflated, is positioned between the apex and skirt portion of the main parachute and eccentric with respect to its center of pressure area so that the length of canopy extended taut by the pilot parachute is less than the normal strung out length of the said canopy, said secondary means having an ultimate tensile strength less than the ultimate tensile strength of said primary connecting means.

5. The combination with a main parachute and a pilot parachute fixedly secured to the apex of said main parachute, of the auxiliary means for connecting said pilot parachute to a plurality of, but not all, the shroud lines of the main parachute at a point between the apex and skirt portion of the main parachute so that the length of canopy extended taut by the pull of the pilot parachute, when inflated, is less than the normal strung out length of said canopy.

6. In an apparatus of the class described, a main parachute and a pilot parachute, and means for attaching said pilot parachute to the main parachute at a point eccentric with respect to and adjacent the center of pressure area of the main parachute so that the pull exerted by the pilot parachute is directed through the point of attachment only.

7. In an apparatus of the class described, a main parachute and a pilot parachute, and means for attaching said pilot parachute to at least one, but not all, of the shroud lines of the main parachute at a point eccentric with respect to the center of pressure area and the skirt portion respectively of the main parachute so that the pull exerted by the pilot parachute, when inflated, is taken through said attached shroud lines when said main canopy is in a strung out position.

EDWARD L. HOFFMAN.